(12) United States Patent
Falk (10) Patent No.: US 8,144,763 B2
(45) Date of Patent: Mar. 27, 2012

(54) IMAGING APPARATUS, IMAGING SYSTEM AND METHOD THEREOF

(75) Inventor: Dietrich Falk, Tokyo (JP)

(73) Assignee: Sony Corporation, Tokyo (JP)

( * ) Notice: Subject to any disclaimer, the term of this patent is extended or adjusted under 35 U.S.C. 154(b) by 950 days.

(21) Appl. No.: 10/893,950

(22) Filed: Jul. 20, 2004

(65) Prior Publication Data

US 2005/0018049 A1 Jan. 27, 2005

(30) Foreign Application Priority Data

Jul. 22, 2003 (JP) ................................. 2003-277765

(51) Int. Cl.
*H04N 7/12* (2006.01)
*H04N 11/02* (2006.01)
*H04N 11/04* (2006.01)

(52) U.S. Cl. .............................. 375/240.01; 348/207.99

(58) Field of Classification Search ............. 375/240.01; 348/207.99
See application file for complete search history.

(56) References Cited

U.S. PATENT DOCUMENTS

| | | | | |
|---|---|---|---|---|
| 4,339,775 A * | 7/1982 | Lemke et al. ................. | 386/200 |
| 6,709,387 B1 * | 3/2004 | Glukhovsky et al. ......... | 600/109 |
| 7,643,055 B2 * | 1/2010 | Uebbing ....................... | 348/155 |
| 2002/0015582 A1 * | 2/2002 | Matsumoto et al. .......... | 386/111 |
| 2002/0149693 A1 * | 10/2002 | Tantalo et al. ................ | 348/362 |
| 2004/0090444 A1 * | 5/2004 | Satoh ............................ | 345/633 |

FOREIGN PATENT DOCUMENTS

| | | |
|---|---|---|
| JP | 10-294933 | 11/1998 |
| JP | 2001-057675 | 2/2001 |
| JP | 2003-078906 | 3/2003 |

* cited by examiner

*Primary Examiner* — Christopher S Kelley
*Assistant Examiner* — Chikaodili E Anyikire
(74) *Attorney, Agent, or Firm* — Oblon, Spivak, McClelland, Maier & Neustadt, L.L.P.

(57) ABSTRACT

To provide a system, apparatus and method of changing frame rate of cameras according to the detector that has sent an alarm signal, in order to optimize utilization of hardware resources. An apparatus for setting a frame rate under which images are captured by a camera in an image capturing system having a plurality of cameras and a plurality of detectors, the apparatus including: detector interface for receiving a first signal from at least one of the sensors; association unit for associating the first signal with information related to the camera; calculation unit for calculating a frame rate of each of the plurality of cameras based on the association between the first signal and the information related to the cameras; setting unit for setting the frame rate of the camera calculation by the calculation unit; and second reception unit (capture card) for receiving image data from the camera at a frame rate set by the setting unit.

14 Claims, 8 Drawing Sheets

| | $C_1$ | $C_2$ | ... | $C_M$ |
|---|---|---|---|---|
| $D_1$ | $e_{11}$ | $e_{12}$ | ... | $e_{1M}$ |
| $D_2$ | $e_{21}$ | $e_{22}$ | ... | $e_{2M}$ |
| ... | | | ... | ... |
| $D_N$ | $e_{N1}$ | $e_{N2}$ | ... | $e_{NM}$ |

FIG. 1

| | $C_1$ | $C_2$ | ... | $C_M$ |
|---|---|---|---|---|
| $D_1$ | $e_{11}$ | $e_{12}$ | ... | $e_{1M}$ |
| $D_2$ | $e_{21}$ | $e_{22}$ | ... | $e_{2M}$ |
| ... | | | ... | ... |
| $D_N$ | $e_{N1}$ | $e_{N2}$ | ... | $e_{NM}$ |

|  | C1 (1102) | C2 (1104) | C3 (1106) | C4 (1108) |
|---|---|---|---|---|
| D1 (1112) | 15 | 5 | – | – |
| D2 (1114) | 5 | 15 | 5 | – |
| D3 (1116) | – | 5 | 15 | 5 |
| D4 (1118) | – | 5 | 5 | 15 |
| D5 | – | 5 | 5 | – |
| D6 | – | 5 | 15 | 5 |
| D7 | – | 5 | 15 | 5 |
| . . . | | | | |

|    | C1 | C2 | C3 | C4 |
|----|----|----|----|----|
| D1 | 15 | 15 | –  | –  |
| D2 | –  | –  | 10 | –  |
| ...|    |    |    |    |

| | Cam 1 | Cam 2 | Cam 3 | Cam 4 |
|---|---|---|---|---|
| Det 1 | 15 | 15 | 0 | 0 |
| Det 2 | 0 | 0 | 10 | 0 |
| Det 3 | 0 | 5 | 15 | 5 |
| Det 4 | 0 | 5 | 5 | 0 |

[Reset] [Save]

| Det | Function | Param 1 | Param 2 |
|---|---|---|---|
| Det 1 | Type A ▽ | 20 | |
| Det 2 | Type A ▽ | 20 | |
| Det 3 | Type C ▽ | 20 | 100 |
| Det 4 | Type A ▽ | 20 | |

[Reset] [Save]

FIG. 16

Configuration / Simulation

Time: 21 △▽

Alarm sequence 10 seconds:Alarm at detector 1   [Charge] [Delete]
20 seconds:Alarm at detector 2   [Charge] [Delete]
→ 24 seconds:Alarm at detector 1   [Charge] [Delete]
[New]

Frame rate(fremes per second):after 21 seconds

| 0 | 10 | 10 | 10 |
|---|---|---|---|
| CAM 1 | CAM 2 | CAM 3 | CAM 4 |

IMAGING APPARATUS, IMAGING SYSTEM AND METHOD THEREOF

CROSS REFERENCE TO RELATED APPLICATIONS

The present document is based on Japanese Priority Application JP2003-277765 filed to the Japanese Patent Office on Jul. 22, 2003, the contents in which being incorporated herein by reference to the extent permitted by law.

BACKGROUND OF THE INVENTION

1. Field of the Invention

The present invention relates to a selective image data encoding apparatus, a selective image data encoding system and method thereof. More specifically, the present invention relates to an apparatus, a system and a method for changing frame rate by which image data from an imaging apparatus is acquired and transmitted or stored in a recording medium according to a setting performed for association of sensor with imaging device. The present invention is also related to a method for setting up the settings for sensor-imaging device association for such apparatus and system.

2. Related Art

Video capture cards and digital video recorders (DVRs) using video capture cards have inherent limitations regarding a maximum frame rate that can be supported over video inputs. Such maximum frame rate denotes the number of frames that can be dealt with (for example, which can be encoded or transmitted) on the card at the same time. An example is a video capture card or DVR with, say, 8 camera inputs that support, for example, a frame rate of 120 frames per second. Such card/DVR would support a theoretical 15 frames per second per camera input.

In conventional systems, the frame rate to be used for a single camera is preset and defined at the time of system setup or startup. For example, the user may specify the frame rate for each single camera or specify time intervals when recording is required and/or not required. Other conventional systems may have an intelligent mechanism that gives a higher frame rate to a camera if some movement is detected in the video data from that camera. In addition, the sensibility of movement may be configured or set to specific areas of the captured scene.

Prior arts of record can be found, for example, in U.S. Pat. No. 6,317,152 for "Digital video recording system" having a video camera directed at a scene of interest to continuously view the scene and generate video images of the scene at a predetermined frame rate; U.S. Pat. No. 4,652,909 for "Television camera and recording system for high definition television having imagers of different frame rate"; and U.S. Pat. No. 5,617,150 for "Video bit rate control method" for changing bit rate of video images for controlling picture quality.

SUMMARY OF THE INVENTION

However, conventional approaches for specifying frame rates for each camera in a system or specifying time intervals for recording result in sub-optimal and frequently inappropriate performance, especially where alarm sequences (more than one alarm is activated, consecutively) are considered in monitoring or surveillance systems. Moreover, as far as limitations in memory capacity, storage space in disks and other media, as well as limitations in bandwidth of communication channels are concerned, continuous recording of some or all cameras at a predetermined frame rate is neither feasible nor practical.

The present invention has been conceived in view of the above-mentioned problems and according to a preferred embodiment of the present invention, there is proposed an apparatus for setting a frame rate under which images are captured by an imaging device in an image capturing system including a plurality of imaging devices and a plurality of sensors, the apparatus including: first reception unit for receiving a first signal from at least one of the sensors; association unit for associating the first signal with information related to the imaging device; calculation unit for calculating a frame rate of each of the plurality of imaging devices based on the association between the first signal and the information related to the imaging device; setting unit for setting the frame rate of the imaging device according to a result of calculation by the calculation unit; and second reception unit for receiving image data from the imaging device at a frame rate set by the setting unit.

Also, it is preferable such apparatus as described above includes a storage unit for storing configuration and setup data related to the association between the first signal and the information related to the imaging device and the frame rate settings; and a controller for controlling the imaging device according to the setup data.

Preferably, the information related to the imaging device includes information used for calculation of frame rate of the imaging device when the first signal is received from the detector.

Still, according to such preferred embodiment of the present invention, the storage unit stores association information between each detector of the plurality of detectors and each imaging device of the plurality of imaging devices in form of a matrix containing information used for calculation of frame rate of each imaging device when the first signal is received from the detector.

According to the preferred embodiment of the present invention, it is preferable to set the frame rate of several imaging devices based on an input from one or more detectors.

It is also desirable to have frame rates for each camera changeable over time, for example, according to a predetermined function.

Moreover, calculation of frame rate to be set or allocated to each camera in the system is based on input from the detectors, i.e., alarm signals, and configuration of the system, i.e., settings associating imaging device with detectors or sensors, time function of the frame rates for each imaging device.

Furthermore, according to another preferred embodiment of the present invention, there is provided a frame rate changing method for changing frame rate of an imaging device in a surveillance system including a plurality of imaging devices and a plurality of sensors, the method having the steps of: receiving a first signal from one of the plurality of sensors; associating the first signal with information related to at least one of the plurality of imaging devices; calculating a frame rate of each of the plurality of imaging devices based on the association between the first signal and the information related to the imaging device; setting the frame rate of the imaging device according to a result of the calculation; and receiving image data from each of the plurality of imaging devices at a frame rate set by the setting unit.

An optimal surveillance system should be able to record as well as process and communicate image data from related cameras at the best quality as possible, for example, 30 frames per second. However, due to technical limitations and budget restrictions in actual systems, the amount of image data that can be recorded or transmitted at a given time or in the long run is limited. For example, a maximum frame rate supported by a capture card limits the amount of image data, typically video data, which can be recorded or encoded at a given time. Limitations in storage capacity, such as disk space, limit the amount of image data that can be recorded over a longer period of time.

The apparatus, system and method according to the preferred embodiments of the present invention aims at alleviating the above problems as it is proposed to select what camera should be allocated a larger amount of frame rates in response to alarm situations detected by detectors or sensors. In other words, according to the preferred embodiments of the present invention, there is proposed an apparatus, a system and a method that permit realize selection of which camera's image data to record within the system and at what frame rate, at what moment and for how long. Given the proper inputs, the apparatus and system according to the present invention are able to calculate the required (for example, the minimum) frame rates for the cameras.

In addition, even with sufficiently capacity, a surveillance system such as a security system should be able to capture image data from the cameras that are most relevant to a given situation. The system, apparatus and method according to the preferred embodiments of the present invention as described above are aimed at allowing the user thereof to obtain a better quality image data of a specific monitored situation. This is achieved by allocating an increased frame rate to cameras that are set up as most crucial to capture relevant images from the alarm scene.

Also, the system, apparatus and method according to the preferred embodiments of the present invention as described above permit the installer of the system or the user to dynamically and flexibly configure and setup the security system so that the specific requirements or restrictions of the environment can be taken into consideration. As a result, it becomes possible to realize an optimum utilization of the available image capturing and or data processing resources.

For example, upon enabling selective allocation of frame rates according to the detector or sensor that has been activated, it becomes possible to obtain an increased amount of information related to the causes or events that caused the alarm, while for non-related images of other imaging devices it suffices not to capture any image at all or to capture images with reduced frame rate.

Such selective allocation of image frame rate according to the preferred embodiments of the present invention permits then to have a image (video) data of higher quality (as a result of images taken at a relatively higher frame rate) only for the relevant events.

By optimizing the utilization of the resources of the system, it is possible to reduce the required storage space and bandwidth for performing the same process.

Also, it is possible to have more reliable pre-alarm video/image data as the system may be set so as to record such image data previous to the occurrence of the alarm with an allocation of a higher frame rate for the concerning or related imaging devices (cameras).

BRIEF DESCRIPTION OF THE DRAWINGS

The above and other objects and features of a preferred embodiment of the present invention will become more readily apparent to those of ordinary skill in the art from the following detailed description taken in conjunction with the accompanying drawings in which:

FIG. 2A shows an example of frame rate function for a camera is set to a value that remains constant for a predetermined time; FIG. 2B shows an example of frame rate function in which the frame rate is given an initial value that decreases linearly over time until reaches zero; and FIG. 2C shows an example in which the frame rate is set to a relatively high value and stays at that value for a certain period of time; after that, the frame rate is reduced, however the corresponding camera still delivers some video data at a lower frame rate for another period of time;

DETAILED DESCRIPTION OF THE PREFERRED EMBODIMENTS OF THE PRESENT INVENTION

Preferred embodiments of the present invention are described below with reference to the attached drawings.

Figure 1:
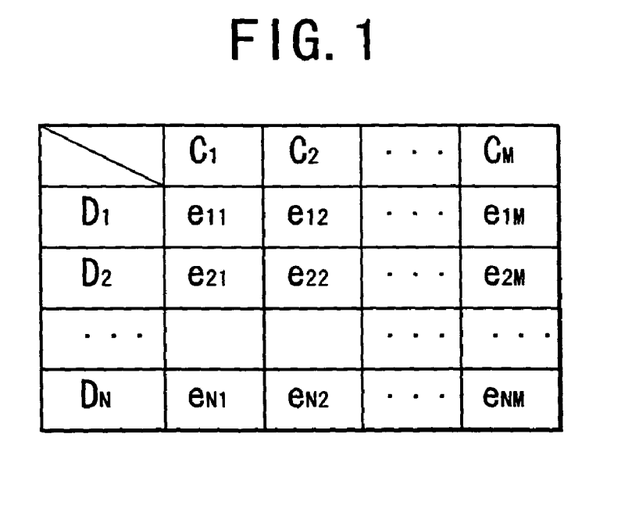
FIG. 1 shows a table illustrating an assignment of frame rates for cameras in a system having a plurality of M cameras $C_1$ to $C_M$ depending on input originated from N detectors $D_1$ to $D_N$, according to a preferred embodiment of the present invention.

FIG. 1 shows a table illustrating an assignment of frame rates for imaging devices such as cameras in a system having a plurality of M cameras $C_1$ to $C_M$ depending on input originated from N detectors $D_1$ to $D_N$. Such detectors may be disposed in a residence for surveillance for security purposes, for example. The system may also include a central processing unit (CPU), a storage medium and a random access memory (RAM). Interconnection or intercommunication between these functional units or devices will be described in more detailed below.

The storage medium serves the purpose of storing data related to settings of the system, image data related to images captured by the imaging devices (cameras), data related to signals from the detectors, etc. In addition, the storage medium may include data related to a logical association between the detectors and the imaging devices of the systems. An example of data stored in the storage medium as such association between detectors and imaging devices is the detector-camera matrix containing frame rate values of frame rates as shown in FIG. 1. Also, an algorithm may be stored for calculating the frame rate, and a setup program. Such setup program may be either resident in the storage medium or may be loaded from an external storage medium to the CPU whenever required.

In addition, more than one detector-camera matrices may be stored in the storage medium, as different settings may be required for different possible situations or conditions under which a user may desire the system to be set to. Such situation may include different modes of operation of the household surveillance system, such as monitoring the house while the house is empty, a nighttime surveillance, surveillance when only kids or pets are left, when the user is at home, etc.

As already mentioned above, the matrix of the system according to the example of preferred embodiment of the present invention a matrix of size N×M, where M is the number of cameras $C_1$ to $C_M$, associated with N detectors $D_1$ to $D_N$. For each element E of the matrix, $e_{nm}$ denotes the number of frames that are used for the calculation of the frame rate that is to be assigned to the camera $C_m$ when the detector $D_n$ originates a signal that the system detects as an alarm.

The storage medium may still have frame rate functions related to frame rate change according to time. These frame rate functions describe how the frame rate for each camera changes over time. Examples of frame rate functions are shown in FIG. 2A to FIG. 2C.

Figure 2:
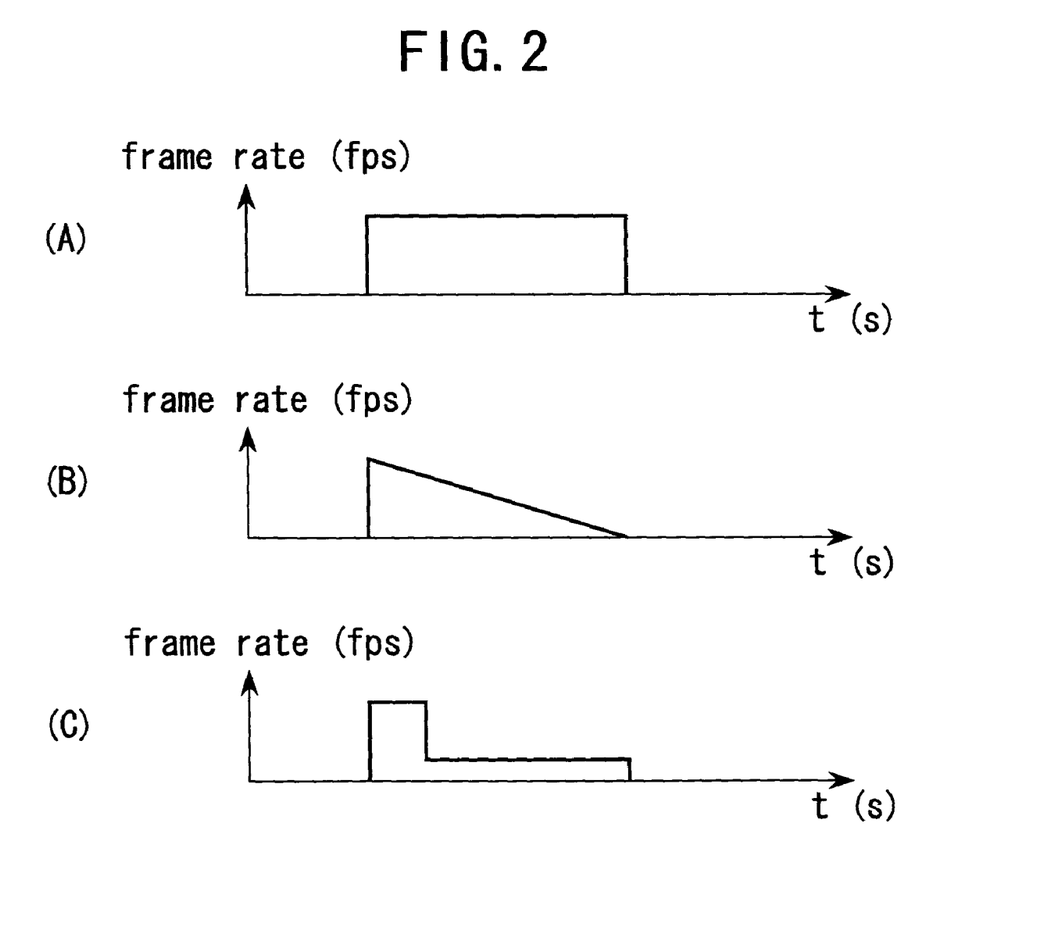
FIG. 2 shows frame rate functions for the cameras according to a preferred embodiment of the present invention.

FIG. 2A shows an example of frame rate function for a camera is set to a value that remains constant for a predetermined time.

FIG. 2B shows an example of frame rate function in which the frame rate is given an initial value that decreases linearly over time until reaches zero.

FIG. 2C shows an example in which the frame rate is set to a relatively high value and stays at that value for a certain period of time. After that, the frame rate is reduced; however the corresponding camera still delivers some image data (video) data at a lower frame rate for another period of time.

The type of frame rate function over time selected by the installer of the system, or eventually by the user, depends on parameters to consider, such as available storage space, bandwidth of the communication channels, potential relevance of the image data from a specific camera in association with a specific detector signal, etc. The function to be chosen is also dependent on the actual hardware (like available resources), the actual outline of the premises on what is going to be monitored or surveyed, preferences of the user and/or installer, etc. Therefore, the possible frame rate functions to be adopted according to a preferred embodiment of the present invention should not be limited to the examples of function described or mentioned in this specification, so that many other forms may be applicable.

In a preferred embodiment of the present invention, a number of predetermined frame rate functions are available to the person who is configuring the system. The functions maybe parameterized as necessary. For example, it is possible to set up a frame rate function for each detector in the system or, alternatively, each of an individual camera-detector combination may be set to its own frame-rate function.

Even through some of these functions may be of analog nature, capture cards might only accept full integer frame rates for camera settings. In such cases, the system would have to map the analog values returned from the functions to a value that will be accepted by the captured card. The procedure of mapping analog values will be omitted here as any such procedure is very well known in the conventional, prior art.

The algorithm for calculating the frame rate of the cameras recalculates the frame rates after (i) an alarm is triggered by a detector or (ii) after a predetermined period of time has elapsed, for example, every second. After an alarm, the frame rates are recalculated based on the values in the detector-camera matrix. It is assumed that two alarms, even if they occurred in parallel, are processed sequentially. After the predetermined period of time is elapsed, the frame rates are recalculated to reflect the specified frame rate functions.

Example of Preferred Embodiment of the Present Invention

Figure 3:
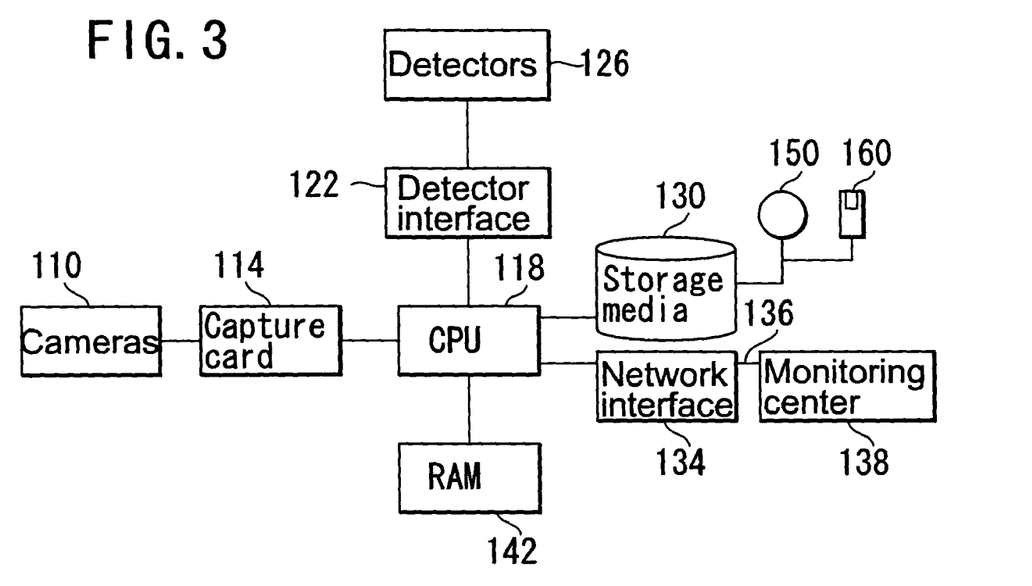
FIG. 3 shows a schematic diagram of an example of image capture system configuration according to a preferred embodiment of the present invention.

FIG. 3 shows a schematic diagram of an example of image capture system configuration according to a preferred embodiment of the present invention.

The example of FIG. 3 shows a system having a group of detectors 126, a set of imaging devices represented by cameras 110, a capture card 114, interfaces 122 for the detectors, a CPU 118, a RAM (Random Access Memory) 142, a storage medium 130 and a network interface 134. The network interface is connected to a communication network 136 such as a local area network, a wide area network, either private or public, such as the Internet, through which the system communicates with a monitoring center 138, for example.

The CPU may communicate with the capture card 114 through an API (Application Programming Interface). On the other hand, the CPU 118 receives encoded image data (video, moving image data, for instance) from the capture card 114. The CPU also receives signals from the detectors 126 through the detector interface 122. The detector interface 122 can be a wireless receiver or a parallel port or any other interface that can take the detector signals as an input.

The CPU 118 sends control commands and image data over the network interface 134 and the communication network 136 to the monitoring center 138. The monitoring center 138 may also send commands to the CPU 118 through the communication network 136 and via the network interface 134 so that a business operator at the monitoring center can change the system settings and camera frame rates remotely. In addition, the monitoring center may include a server (not shown) for storing data related to a plurality of user, i.e., there may be data stored in such server related to a plurality of systems as shown in FIG. 3.

Figure 4:
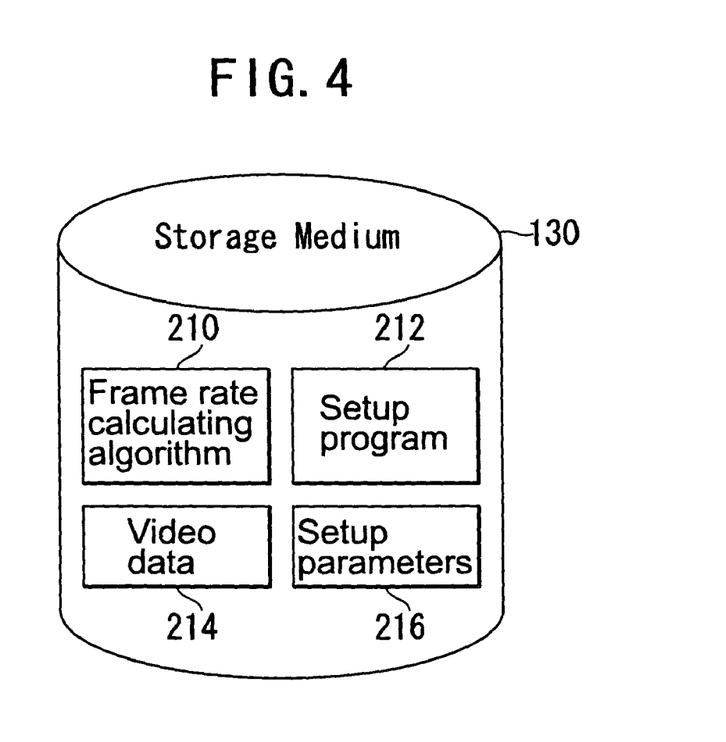
FIG. 4 shows an example of storage medium 130 according to a preferred embodiment of the present invention.

FIG. 4 shows an example of storage medium 130 according to a preferred embodiment of the present invention. The storage medium 130 may have a frame rate calculating algorithm 210, a setup program 212, image or video data 214 and the setup parameters for the system. The setup parameters may include the detector-camera matrices and frame rate function tables. Such modes, as already mentioned, may include parameters that are setup according to situations as set forth by the user such as image capture for surveillance during day time, night time, during absence of the residents, with children, pets and/or elderly and/or disabled people left at home, etc.

In addition, the information stored in the storage medium may be information that is transferred thereto from a detachable recording medium such as a disk medium 150 or an IC or semiconductor memory device 160 as shown in FIG. 3. The disk medium may include any kind of medium such a magnetic disk, an optical disk, a magneto-optical disk and the like. Also, for the present invention, there is no restriction of the IC or semiconductor memory 160 as to type of semiconductor memory and it may include any card or memory device complying with any standard.

Having the proper interface (not shown in the figures) for connection to the system of the present invention, such media may contain at least one of the data required for the system as mentioned above, such as the frame rate calculating algorithm 210, the setup program 212, etc.

Conversely, data from the storage medium may be transferred to the disk medium 150 and/or the memory device 160, such as video the data 214 captured from one of the cameras 110. Also the setup parameters of the system may be stored in the detachable media for backup purposes, for example.

Figure 5:
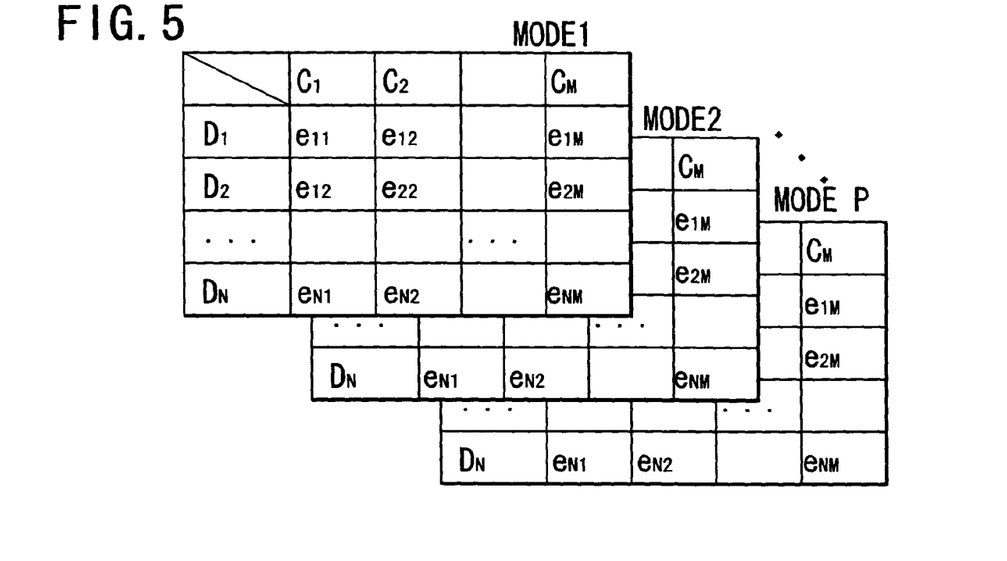
FIG. 5 shows camera-detector matrices (association between cameras and detectors) according to a preferred embodiment of the present invention.

An example of camera-detector matrices, i.e., association between cameras 110 and detectors 126 is shown in FIG. 5, in which a plurality of tables are set according to operation modes Mode 1 to Mode P. Each matrix has $D_1$ to $D_N$ detectors associated with $C_1$ to $C_M$ and their relationship, i.e., the frame rate $e_{nm}$ to be assigned to a camera $C_m$ (where "m" is a positive integer ranging from 1 to M) in an event of activation of a detector $D_n$ (where "n" is a positive integer ranging from 1 to M). Although not explicitly shown in the matrices of FIG. 5, it is a matter of course that it is preferable that each of the frame rates $e_{nm}$ may differ depending on the operation mode 1 to P that is activated.

Figure 6:
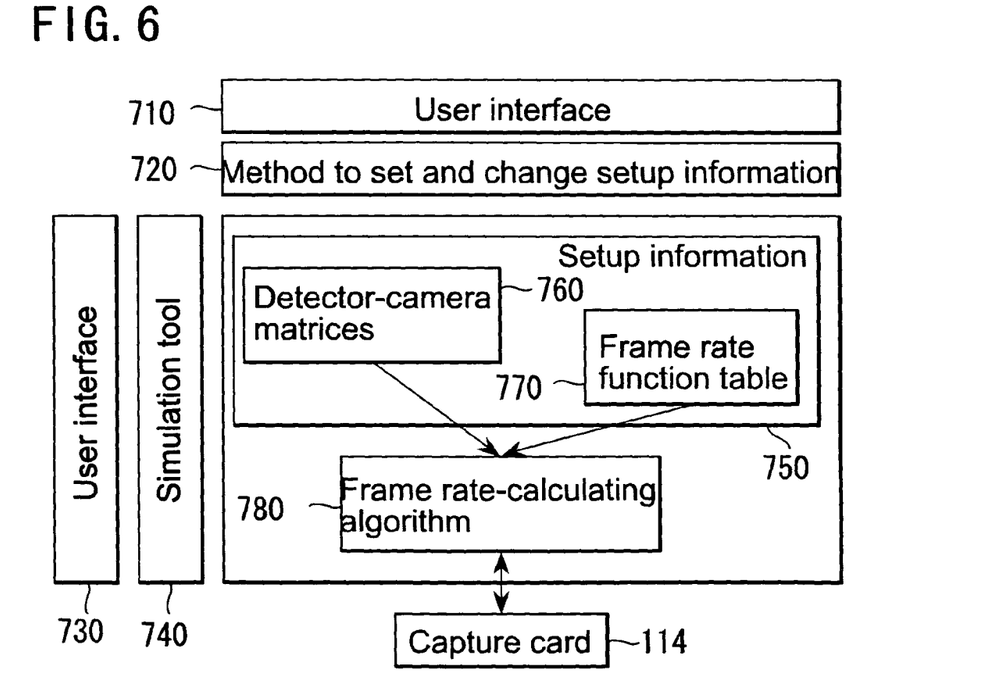
FIG. 6 shows a schematic view of a relationship between functional blocks corresponding to the process and calculations performed by an image capture apparatus and/or system according to a preferred embodiment of the present invention.

Now, FIG. 6 shows a schematic view of a relationship between functional blocks corresponding to the process and calculations performed by an image capture apparatus and/or system according to a preferred embodiment of the present invention. The setup information 750 for the apparatus and/or system according to the present invention includes the detector-camera matrices 760 with respective frame rate values and a frame rate function table 770 containing information that permit specify frame rate functions as, for example, those functions mentioned above. A frame rate calculating algorithm 780 utilizes the setup information 750 for calculating the frame rate under the conditions as mentioned above, i.e., at an activation of a detector, after a predetermined period of time and the like. The calculated frame-rates are then supplied to the capture card 114, which is part of the system according to the present invention as shown, for example, in FIG. 3.

In order to either set/change the setup information or perform simulation of the operation of the system according to the present invention, user interfaces may be provided for the system and/or apparatus according to the preferred embodiment of the present invention. In the example shown in FIG. 6, a user interface 710 is associated to a method 720 to set and change set up information and a user interface 730 is associated to a simulation tool 740. Such interfaces provide means for a user or installer of the system and/or apparatus according to the preferred embodiment of the present invention to inputting data for setup or changing settings of the system as well as for performing simulation of the operation of the system before activating the settings for actual operation.

Figure 15:
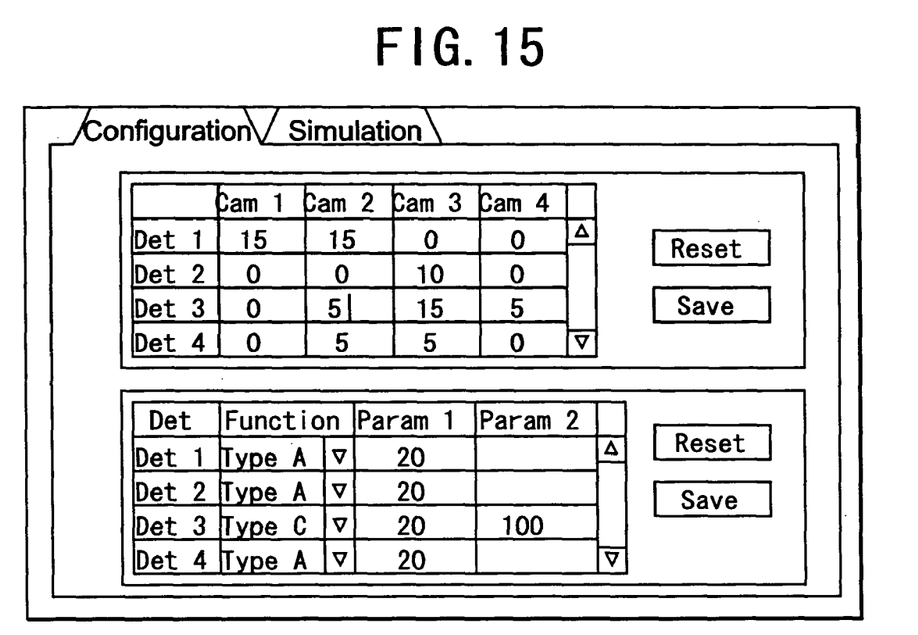
FIG. 15 shows a schematic view of an interface for the system configuration, i.e., the setting and changing of the setting information of a system according to a preferred embodiment of the present invention.
Figure 16:
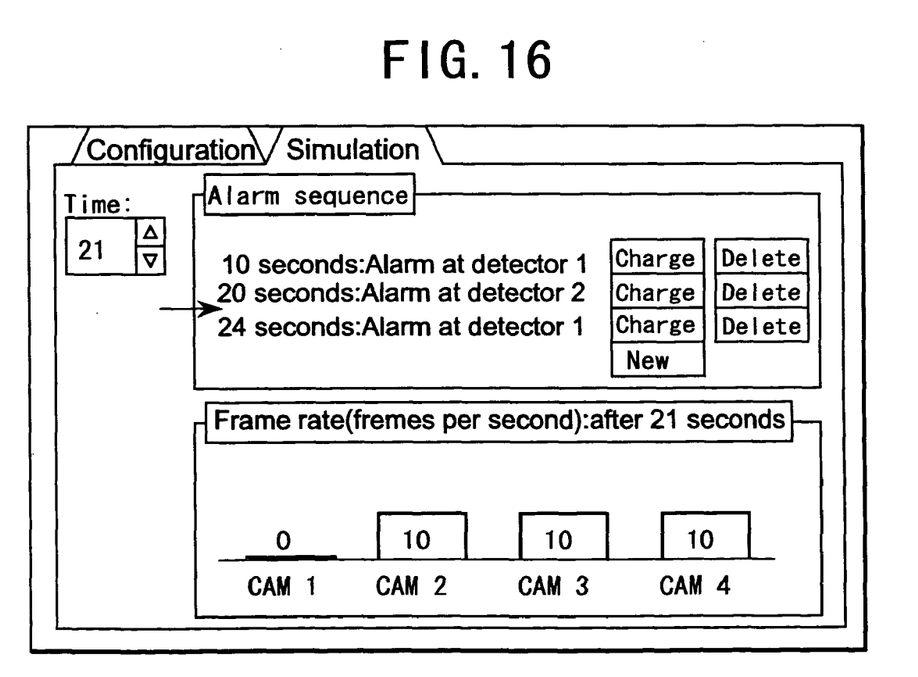
FIG. 16 shows a schematic view of a simulation tool for simulating the results of input and setup of a system according to a preferred embodiment of the present invention.

An example of user interfaces according to a preferred embodiment of the present invention is shown in FIG. 15 and FIG. 16, where FIG. 15 shows a schematic view of an interface for the system configuration, i.e., the setting and changing of the setting information of the system (720 in FIG. 6); and FIG. 16 shows a schematic view of a simulation tool (740 in FIG. 6) for simulating the results of input and setup. Such interfaces as shown in FIG. 15 and FIG. 16 may be represented in a display of a display terminal available at the monitoring center 138 as shown in FIG. 3 or at a terminal provided in the residence of the user or the local where the image capture system of the present invention is installed. An example of display is a screen display available in a personal computer on which the settings, image data and other information pertinent to the system according to the present invention, are input to the system through the conventional input unit available to the personal computer such as key boards, ten keys, audio input through microphones, data transfer from other personal computers, etc. The information is stored in a storage unit, available either inside the computer, such as a hard disk drive, or in a detachable recording or storage medium such as optical, magnetic, magneto-optical disks and the like, IC memories, semiconductor memories, etc.

In the display screen as exemplified in FIG. 15, the imaging system according to the present invention includes four detectors Det 1 to Det 4 associated to four cameras Cam 1 to Cam 4. In the figure, the camera Cam 3 has (at least) 10 frames per second allocated if detector Det 2 detects an alarm, while the other cameras are set zero frames per second. That means when detect Det 2 detects an alarm, priority is given to capture of images from camera Cam 3, while image from the others are not relevant. Also, according to the settings, Cam 2 is allocated 5 frames per second, Cam 3 is allocated 15 frames per second and Cam 4 is allocated 5 frames per second in the event of detector Det 3 being activated. Saving of such setting values are performed by striking or selecting an option "SAVE" as shown in the right side of the camera-detector matrix. Likewise, reset of the setting is performed through selection of "RESET" in the figure.

In addition, each detector has a frame rate function designation area, which corresponds to the bottom half of the display screen shown in FIG. 15. For example detector Det 3 has a function "Type C" which corresponds, for example to the frame rate function as illustrated in FIG. 2C.

The frame rate function of FIG. 2C has an initial value that remains constant for a first period of time and then is reduced to a smaller value and remains constant for a second period of time. Such first and second periods of time for the constant functions correspond to the parameters to be inputted to the system as shown in FIG. 15. The parameter Param 1 having value 20 for the detector Det 2 means the first higher value of frame rate is kept constant for 20 seconds, for example, and the second lower value, for example one half of the first frame rate is kept constant for 100 seconds, as indicated in parameter Param 2.

Likewise, the other detectors in FIG. 15 show function type A, which corresponds, for example to the frame rate function illustrated in FIG. 2A, i.e., a constant value. Such constant value lasts 20 seconds, as designated through parameter Param 1, in the figure. Also, in a similar way as already described above, the function type and parameter may be either reset through the selection of "RESET" function or saved through the selection of "SAVE" function as illustrated in FIG. 15.

Now, the example of input interface for the Simulation Tool 740 of FIG. 6 is illustrated in FIG. 16. Upon settings of the system are performed, for example, through the configuration screen of FIG. 15, a simulation of the operations under the input conditions may be performed corresponding to change in frame rate allocation according to time lapse.

The specific example illustrated in FIG. 16 shows the result of simulation of the system after 21 seconds under the configuration of FIG. 15. In other words, as the parameter for time is set 20 seconds for all detectors as shown in FIG. 15, an alarm at detector Det 1 gives the frame rates of 15, 15, 0 and 0 for the cameras Cam 1, Cam2, Cam 3 and Cam 4, respectively. Then, after the 20th second, i.e., 10 seconds after the previous alarm, another alarm at detector Det 2 is activated so that at the 21st second, the frame rates for the cameras Cam 1, Cam 2, Cam 3 and Cam 4 are respectively changed to 0, 10, 10 and 10 frames per second.

The simulation interface as illustrated in FIG. 16 also permits changing and/or deletion of the alarm sequence. Moreover, a cursor represented by an arrow permits navigating over the timeline, so that the frame rate for each camera at a specific time may be shown. Furthermore, a graphic representation of the frame rates for each camera is shown in the bottom of FIG. 16.

Figure 7:
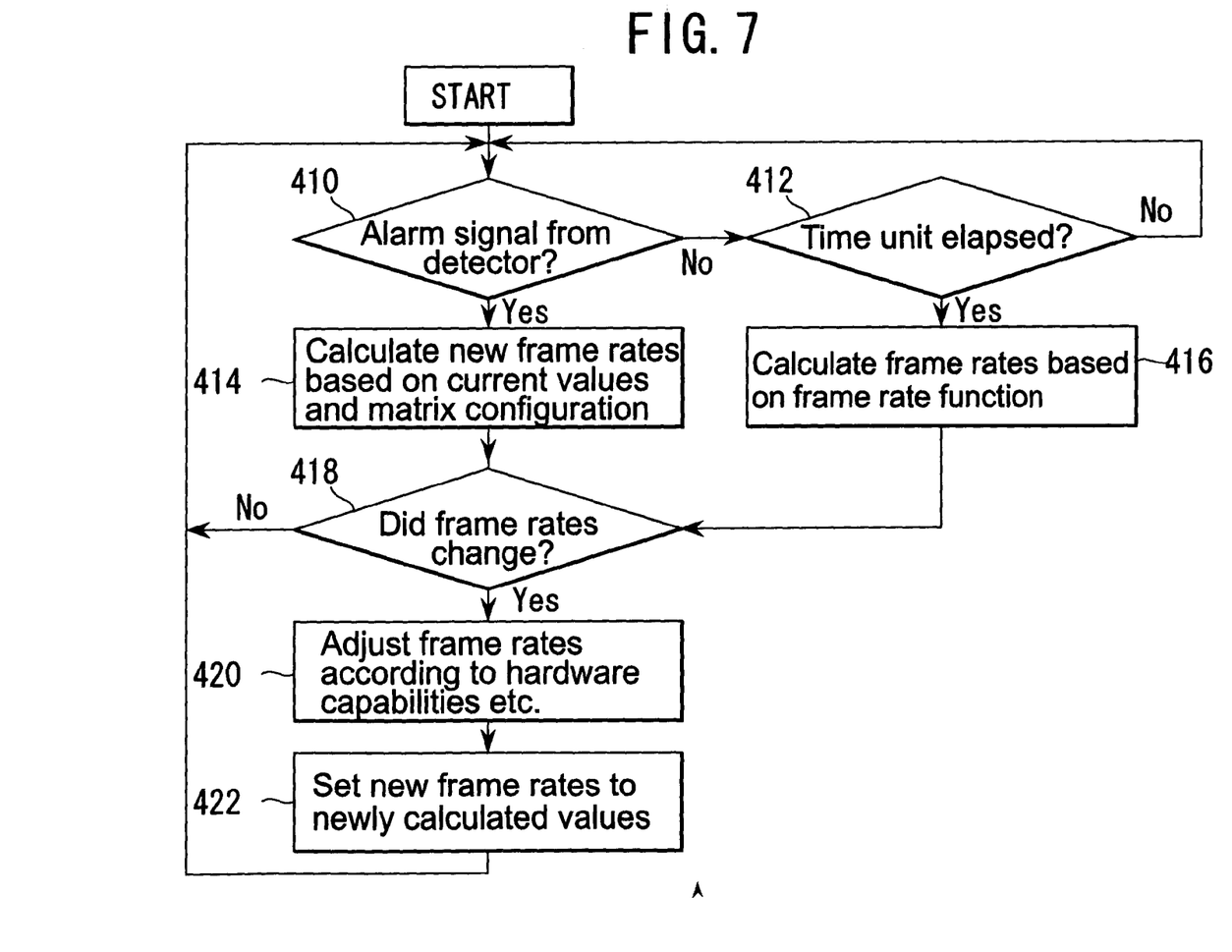
FIG. 7 shows a flowchart of a frame rate calculating process according to a preferred embodiment of the present invention.

Now a method for calculating individual frame rates will be described in the following with reference to FIG. 7 as an example of preferred embodiment of the present invention to be applied, for example, to the frame rate calculating algorithm 780 as shown in FIG. 6.

In step 410, it is verified whether or not an alarm has been detected by a detector in the system. If there is an alarm, the process goes to step 414, otherwise the process goes to step 412. In step 414, the frame rates of the cameras are calculated based on the current frame rate values of each camera and the settings that are stored in the matrix. Then, in step 418, it is verified whether the newly calculated frame rates differ from the current settings and then proceeds with step 420 if affirmative. In step 420, the changed frame rates are adjusted according to the capabilities of the system such as restrictions in storage capability, transmission rate, bandwidth, etc., as well as limitation imposed by switching and the like. The capture card is informed of the actual frame rates that should be allocated.

For example, even if the frame rate calculating algorithm calculates 15 frames per second for a first camera and a second camera in step 414, if the actual capture card can support only 15-13 frames per second because of switching, for example, then in step 420 the values calculated by the frame rate calculating algorithm (15-15) are changed to 15-13, which corresponds to frame rate values that the actual hardware can actually support.

Now, the procedure will be described for a case in which the system does not detect an alarm signal from the detectors. In that case, it is verified whether a time unit, i.e., a predetermined period of time, has elapsed. If so, the frame rates are calculated based on the frame rate functions that are set as already described above. If not, the process goes back to the beginning to check for an alarm signal, again.

Although the example of preferred embodiment as described above performs calculation of frame rates by means of the frame rate calculating algorithm 780 as shown in FIG. 6 and such frame rate calculating algorithm 780 loaded for example in the CPU 118 as shown in FIG. 3, it is also possible to perform frame rate calculation at the monitoring center 138 of FIG. 3 equipped with a central server and the like and located remotely in relation to the location in which the image capture system, for example, a surveillance system of the present invention is installed.

Examples of preferred embodiments of the present invention will be described with more details as follows:

First Example of Preferred Embodiment

Figure 8:
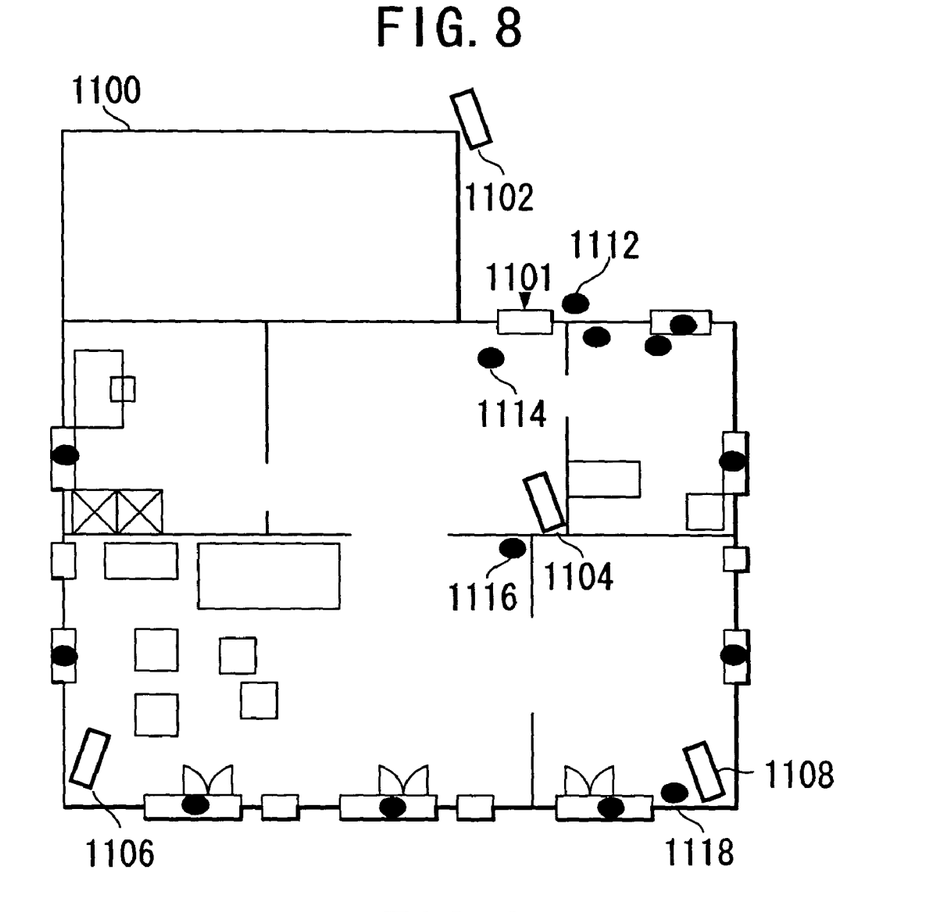
FIG. 8 shows a schematic view of a first example of preferred embodiment of the present invention described as a surveillance system for security purposes installed in a residence.

A first example of preferred embodiment of the present invention is described as a surveillance system for security purposes, installed in a residence, as shown in FIG. 8. The residence includes a house structure 1100 having detectors 1112, 1114, 1116, 1118, etc. represented by circular shapes in the figure, and cameras 1102, 1104, 1106 and 1108, represented by small rectangular shapes in the figure, as imaging devices for image capture in the event of alarm signals detected by any of the detectors. The detector may include any kind of detector that is placed in the house according to the desired event to be detected. For instance, movement detectors may be placed at doors, smoke detectors or sensors may be placed in the kitchen, vibration sensors may be placed at windows for detecting more than usual vibration or movement at windows, etc.

In the present example, it is assumed a capture card 114 as shown in FIG. 3 can support up to 30 frames per second for all cameras and only one matrix is considered for a case in which the security system is in an empty house mode, for example. The system setup for such system for the 4 cameras C1 (1102), C2 (1104), C3 (1106) and C4 (1108) are described in FIG. 9.

Figure 9:
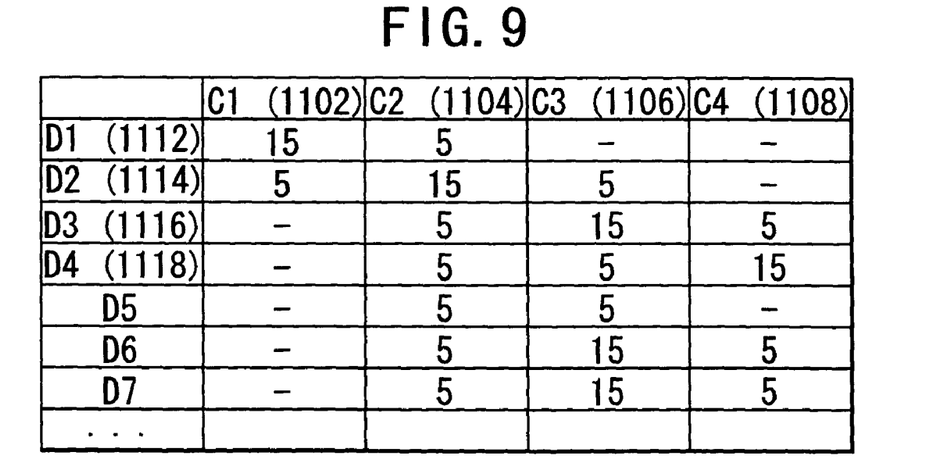
FIG. 9 shows camera-detector matrix according to the first example of preferred embodiment of the present invention.

According to FIG. 9, if an alarm occurs at detector D1 (1112), camera C1 (1102) is set to a minimum of 15 frames per second and camera C2 (1104) is set to a minimum of 5 frames per second. On the other hand, if an alarm occurs at detector 1114, camera C1 is set to a minimum of 5 frames per second, while camera C2 is set to a minimum of 15 frames per second and camera C3 is set to at least 5 frames per second.

Figure 10:
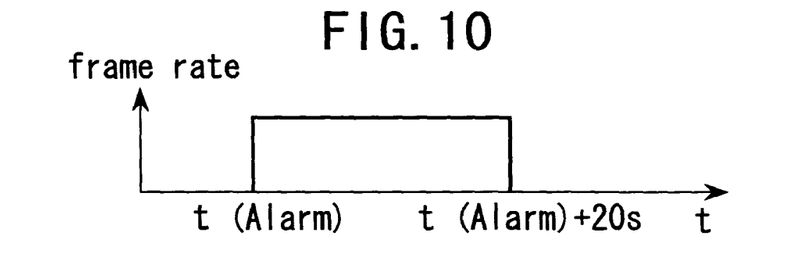
FIG. 10 shows a frame rate function utilized in the first example of preferred embodiment of the present invention.

Furthermore, it is assumed in this first example of preferred embodiment of the present invention that the frame rate function is the same for each detector. Such frame rate function may have a shape as shown in FIG. 10.

Assuming that somebody passes through the main entrance door 1101 of the house schematically shown in FIG. 8, an alarm is triggered at the movement detector 1112, which is, for example, placed outside the house, near the main entrance door. The system may be configured such that images from the camera 1102 behind the door are recorded as soon as somebody triggers an alarm at the detector in front of the door. That leads to "pre-alarm" video and more meaningful information regarding the recording of images related to the event of alarm trigger. In this present example, the system setup is achieved by setting the first line in the matrix as shown in FIG. 9. Specifically, when an alarm is detected by detector 1112, the frame rate for the camera 1104 is set to 5 frames per second, as shown in FIG. 9.

Second Example of Preferred Embodiment

Figure 11:
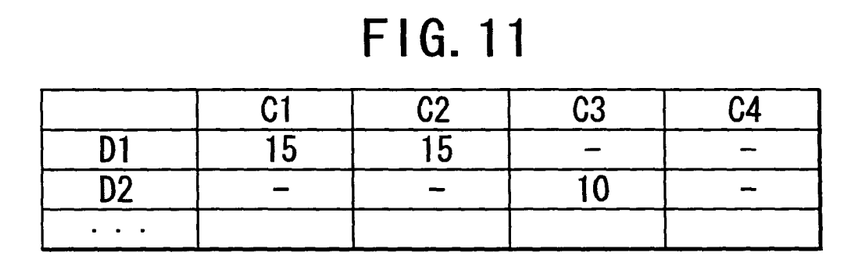
FIG. 11 shows camera-detector matrix according to a second example of preferred embodiment of the present invention.

A second example of preferred embodiment of the present will be described as follows. FIG. 11 shows a frame rate matrix for a surveillance system in which there are 4 cameras available, namely camera C1, C2, C3 and C4 associated with a plurality of detectors D1, D2, etc. The matrix in the figure is simplified to show only the frame rates to be allocated for alarms detected by detectors D0 and D1. It is also assumed that the system has a configuration similar to that shown in FIG. 3, so the system has a capture card 114 and this capture card has capacity to support 30 frames per second.

The values in the matrix show the specification for minimum frame rates, i.e., after an alarm occurred at a given detector, the frame rates for the cameras have to be set to at least the frame rate specified in the matrix. If an alarm at another detector occurs shortly after a previous alarm, not all frame rate requests might be satisfied due to the overall frame rate limitation of the system. Considering the detector-camera matrix of FIG. 11, an alarm at detector D1 will set the frame rates at camera C1 and C2 to 15 frames per second each. An alarm at detector D2 will set the frame rate at camera C3 to 10 frames per second. If an alarm at detector D1 is followed by an alarm at detector D2, it will be required to reduce the frame rates at cameras C1 and C2 because the capture card, as already mentioned, supports only up to 30 frames per second. In that case, an alarm at detector D0 requiring 15 frame rates for cameras C1 and C21, followed by an alarm at detector D2 requiring 10 frames per second for camera C3, results that cameras C1 and C2 will have together a maximum of 20 frames per second to share, for example, 10 frames per second each.

Figure 12:
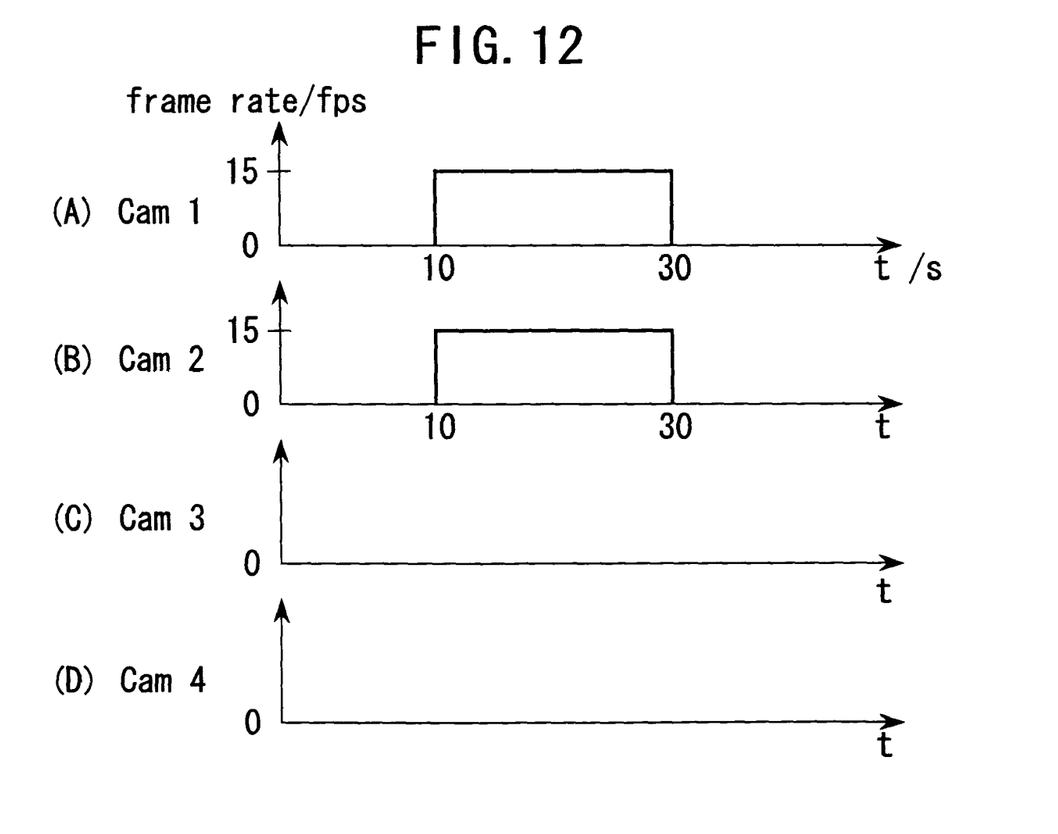
FIG. 12 shows schematic diagrams of allocated frame rates for each camera in the case an alarm is detected at detector D1, according to FIG. 11.
Figure 13:
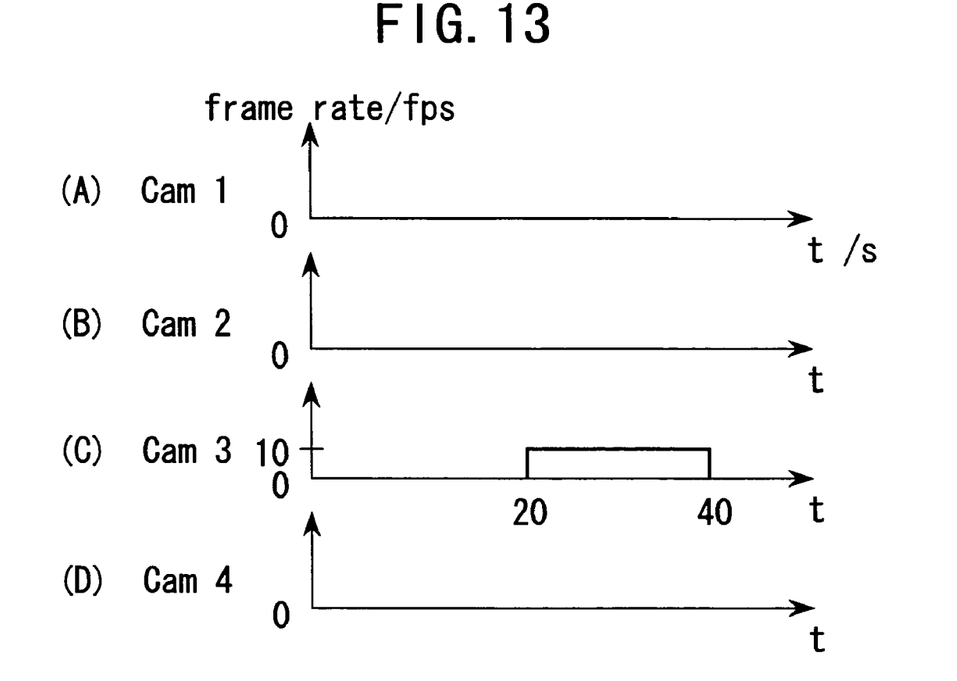
FIG. 13 shows allocated frame rates for each camera in the case an alarm is detected at detector D2 according to FIG. 11.
Figure 14:
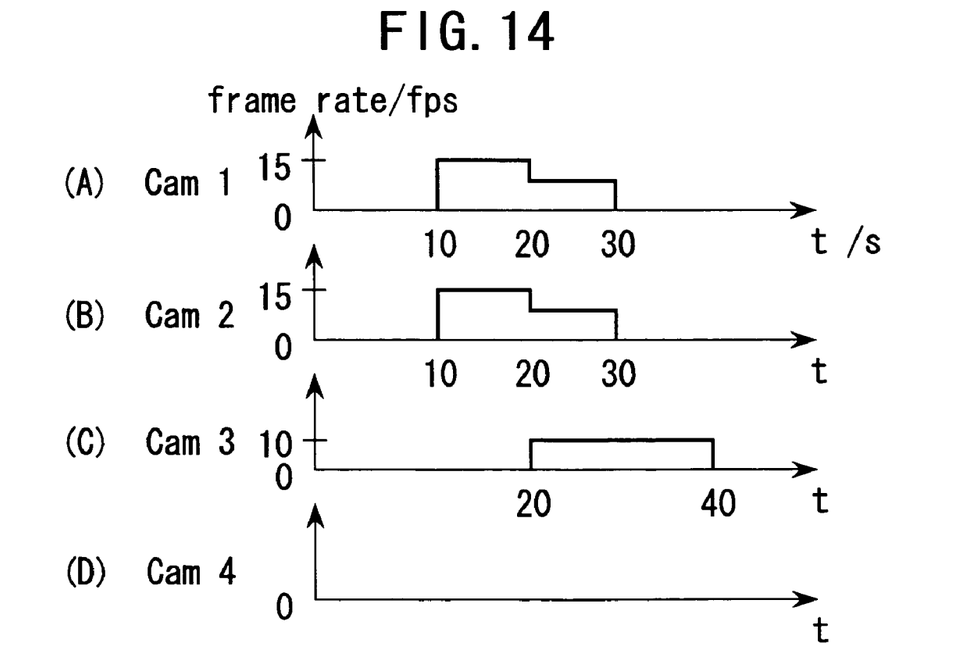
FIG. 14 shows a case in which there are consecutive alarms at detectors D1 and D2, respectively, according to FIG. 11.

The following description clarifies the situation. FIG. 12 shows schematic diagrams of allocated frame rates for each camera in the case an alarm is detected at detector D1, according to FIG. 11. FIG. 13 shows allocated frame rates for each camera in the case an alarm is detected at detector D2 according to FIG. 11. FIG. 14 shows a case in which there are consecutive alarms at detectors D1 and D2, respectively.

More specifically, an alarm at detector D1 occurs at the tenth second in the timeline as shown in FIG. 12. As a result, according to the matrix of FIG. 11, the frame rate of cameras C1 and C2 are set to 15 frames per second. Considering that the frame rate function for the cameras is the same function as shown in FIG. 10 for all cameras, i.e., the frame rate remaining constant for a period of time of 20 seconds and turning to zero thereafter, the frame rates for the cameras C10 and C2 remains at 15 frames per second for 20 seconds. In the example of FIG. 12, no other alarm occurs during the 20 seconds subsequent to the alarm at detector D1.

FIG. 13 shows a case in which an alarm occurs at detector D2 in the twentieth second. Therefore, according to the frame rate function of FIG. 10 and the camera-detector frame rate matrix of FIG. 11, the frame rate of the camera C3 is set to a minimum of 10 frames per second during 20 seconds after the alarm. In addition, no further alarm occurs during the subsequent 20 seconds.

FIG. 14 shows a case in which an alarm is detected by detector D1 in the tenth second, followed by an alarm detected by detector D2 in the twentieth second, i.e., 10 seconds after the alarm at D1. In that case, the frame rate is first set to 15 frames per seconds to cameras C1 and C2, totaling 30 frames per seconds, which, for this example of preferred embodiment of the present invention, is supposed to be the maximum frame rate supported by the system. As a result, upon an alarm occurring at detector D2 10 seconds after the alarm at D1 causes the system to give priority to allocate the minimum of 10 frames per second to camera C3. Since the system supports only 30 frames per second, after the alarm at detector D2, it is not possible to keep the 15 frames per second for cameras C1 and C2 any longer. The result is reducing the frame rates of cameras C1 and C2 after having the 10 frame rates allocated for camera C3.

Furthermore, it is possible to provide a simulation tool for system according to the preferred embodiment of the present invention, in which the settings and parameters of the system are input as in the actual system and then the signals from the detectors are simulated as data that is manually input by the installer of the system, for example. By simulating the inputs of the system, it is possible to verify the behavior, i.e., how the images from each camera come as a result of activation of the detectors, so as to assure the system will operate with the expected results, and if not, a readjustment may be performed until the outputs are satisfactory.

Although the present invention having been described hereinabove in its preferred form with a certain degree of particularity, other changes, variations, combinations and sub-combinations are possible therein. It is therefore to be understood to those of ordinary skill in the art that any modifications will be practiced otherwise than as specifically described herein without departing from the scope the present invention.

For example, the description above has been carried out in part describing a configuration in which the system controls the frame rates of the imaging devices (cameras), it is possible to have a system in which the frame rates are adjusted for the capture card, i.e., although the cameras keep a same frame rate as they are set in the beginning, the changes are made for the way the images are processed and transmitted within the system. As the restrictions of the system lies on storage space, bandwidth and processing capacity, processing speed of the system, etc., adjustments of frame rate may be performed immediately before the unit or section or step that has the limitation.

Moreover, although the examples of preferred embodiments of the present invention have been described for detectors, it is possible to have sensors instead of detectors, so that a switching device sending an ON/OFF (1/0) signal should be sufficient to work as a device for providing input for the system.

In addition, the monitoring center 138 of FIG. 3, which may be typically administrated by a monitoring business provider, has been described as a single apparatus or system. However, it is possible to provide a configuration in which there is two or more similar security servers separated according to criteria like geographical distribution of users, volume of data, time, classification of users, type of event causing alarm (intrusion, accident, telephone call, visits, etc.).

Also, the displays and layouts for the system settings, the interface for the configuration too, the simulation tool, the terminal of the monitoring center, etc. may be of layouts and format different from what has been presented above.

Moreover, functional units described in the block diagrams as been separated may be actually realized as a same physical unit or apparatus. Conversely, functions that have been described above as been included in a same functional block may be separated in different blocks or be incorporated in other blocks.

In addition the network interfaces and data interfaces between the server at the monitoring center 138 and the system of the present invention transmitting data through the communication network 134 may include converters available in existing modems, routers, communication hubs or server units, either wireless or not, utilized in combination with purposes and functions other than specifically described for the preferred embodiments of the present invention.

Although the description of the present system having been made focused on an application for surveillance for home or household security against intruders, violation of private property such as robbing or theft, security monitoring and alarm against gas leakage, fire, smoke or the like, it is possible to apply the embodiments of present invention for monitoring activity such as movement in the house when elderly or physically and/or psychologically challenging people, infants, children or pets are left in the house, so that the activity may be, for example, constantly monitored or alarm may be triggered if a designated object is touched or activated, such as inadvertent activation of electronic appliances, falling objects, broken objects, voice or sound level above a predetermined level (crying, etc.) or the like.

Especially in case of elderly people or disabled people, the application of the present invention may be significant for social welfare purposes other than for simple home security purposes. For example, a switch that is conventionally set in a hot water pot may serve as a sensor for detecting activation of the house appliance. If the time period between one activation of the hot water pot and the next activation exceed a predetermined period of time (for example, 6 hours), an alarm signal may indicate an abnormality, as the person may have stopped normal life activity within the house. Likewise, a sensor may be installed to detect utilization of resources that are presumed essential for life activity within a house, such as utilization of water or light within the house, so that the sensors or the preferred embodiments of the present invention may include switches, sensors, devices or apparatuses already existing for other purposes instead of dedicated apparatuses for the only purpose of monitoring.

It is therefore to be noted that the preferred embodiments of the present invention are not limited to the above-mentioned examples of preferred embodiments, so that examples of preferred embodiments of the present invention and equivalents thereof may be appropriately modified, combined, subcombined, etc., to be implemented within the scope and the spirit of the invention.

What is claimed is:

1. An apparatus for setting a frame rate under which images are captured by an imaging device in an image capturing system including a plurality of imaging devices and a plurality of sensors, the apparatus comprising:
   a storage unit configured to store information related to said imaging device, said information related to said imaging device indicating a predetermined frame rate for each of the plurality of imaging devices based on a respective signal received from one of the plurality of sensors, and to store a plurality of frame rate function data which each correspond to a different function indicating how a frame rate of the imaging device varies over a predetermined time interval, wherein at least one of the frame rate function data indicates a non-constant frame rate over the predetermined time interval;
   a first reception unit configured to receive a first signal from at least one of said sensors;
   an association unit configured to associate said first signal with the information related to said imaging device;
   a calculation unit configured to determine a frame rate of each of said plurality of imaging devices based on said association between said first signal and said information related to said imaging device;
   a setting unit configured to set said frame rate of each of said plurality of imaging devices according to a result of the determination by said calculation unit, and to set a variation of a frame rate of said imaging device according to one of the plurality of frame rate function data stored in the storage unit, wherein one of the plurality of frame rate function data is separately set for each of the plurality of imaging devices based on the reception of the first signal from the at least one of said sensors; and
   a second reception unit configured to receive image data from each of said plurality of imaging devices at said frame rate set by said setting unit.

2. The apparatus according to claim 1,
   wherein the storage unit is configured to store configuration and setup data related to said association between said first signal and said information related to said imaging device and said frame rate set for each of said plurality of imaging devices; and
   a controller configured to control said imaging device according to said setup data.

3. The apparatus according to claim 2, wherein said storage unit is configured to store association information between each sensor of said plurality of sensors and each imaging device of said plurality of imaging devices in a form of a matrix containing said information related to said imaging device.

4. The apparatus according to claim 3, wherein said matrix includes values of a minimum frame rate required for each imaging device when a signal from said sensor is received.

5. The apparatus according to claim 2, wherein said storage unit is configured to store a plurality of matrices containing said information related to said imaging device, and each matrix of the plurality of matrices designates a mode of operation.

6. The apparatus according to claim 1, wherein said calculation unit is configured to determine said frame rate of each of said plurality of imaging devices after a lapse of a predetermined period of time.

7. The apparatus according to claim 1, wherein said setting unit is configured to set said frame rate of each of said plurality of imaging devices based on a maximum available frame rate.

8. The apparatus according to claim 1, further comprising:
   a converter configured to convert said image data to a digital signal if said image data includes an analog signal;
   a recording unit configured to record said image data in digital form; and
   an output unit configured to output said image data.

9. A frame rate changing method, implemented in an apparatus for setting a frame rate, for changing a frame rate of an imaging device in a surveillance system including a plurality of imaging devices and a plurality of sensors, the method comprising the steps of:
   receiving a first signal from one of said plurality of sensors;
   associating said first signal with information related to said imaging device, said information related to said imaging device being stored in said apparatus and indicating a predetermined frame rate for each of the plurality of imaging devices based on a respective signal received from one of the plurality of sensors, and storing a plurality of frame rate function data which each correspond to a different function indicating how a frame rate of the imaging device varies over a predetermined time interval, wherein at least one of the frame rate function data indicates a non-constant frame rate over the predetermined time interval;
   determining a frame rate of each of said plurality of imaging devices based on said association between said first signal and said information related to said imaging device;
   setting said frame rate of each of said plurality of imaging devices according to a result of said determination at said determining step, and setting a variation of a frame rate of said imaging device according to one of the stored plurality of frame rate function data, wherein one of the plurality of frame rate function data is separately set for each of the plurality of imaging devices based on the reception of the first signal from the at least one of said sensors; and
   receiving image data from each of said plurality of imaging devices at said frame rate set at said setting step.

10. The apparatus according to claim 1, wherein each of the plurality of sensors is associated with one of the plurality of frame rate function data stored in the storage unit.

11. The apparatus according to claim 1, wherein at least one of the plurality of frame rate function data corresponds to a function by which the frame rate gradually changes over the predetermined time interval.

12. The apparatus according to claim 1, wherein at least one of the plurality of frame rate function data corresponds to a function which has a first parameter indicating a time interval at which the frame rate is constant at a first value, and a second parameter indicating a time interval following the first time interval at which the frame rate is constant at a second value.

13. The apparatus according to claim 1, wherein the information related to said imaging device includes multiple respective predetermined frame rates for each imaging device such that each imaging device has a separate predetermined frame rate for when each of the plurality of sensors sends a signal to the first reception unit and the predetermined frame rates are determined prior to the first reception unit receiving the first signal from the at least one of said sensors.

14. The frame rate changing method according to claim 9, wherein the information related to said imaging device includes multiple respective predetermined frame rates for each imaging device such that each imaging device has a separate predetermined frame rate for when a signal is received from each of the plurality of sensors in the receiving, and the predetermined frame rates are determined prior to the receiving the first signal from the at least one of said sensors.

\* \* \* \* \*